United States Patent
Roeingh et al.

(10) Patent No.: US 6,589,372 B1
(45) Date of Patent: Jul. 8, 2003

(54) PLAIN BEARING PRODUCING METHOD

(75) Inventors: Konrad Roeingh, Hilchenbach (DE); Werner Greis, Kreuztal (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 09/889,806

(22) PCT Filed: Jan. 22, 2000

(86) PCT No.: PCT/EP00/00488
§ 371 (c)(1),
(2), (4) Date: Jul. 20, 2001

(87) PCT Pub. No.: WO00/47788
PCT Pub. Date: Aug. 17, 2000

(30) Foreign Application Priority Data

Feb. 9, 1999 (DE) .......................................... 199 05 213

(51) Int. Cl.⁷ .......................... C22C 13/02; F16C 33/12
(52) U.S. Cl. ...................... 148/539; 148/906; 29/527.6; 29/898.059
(58) Field of Search ................................ 420/561, 562; 428/647; 148/539, 906; 29/898.059, 527.6

(56) References Cited

U.S. PATENT DOCUMENTS

| | | | |
|---|---|---|---|
| 3,653,109 A | * | 4/1972 | Timmesmans |
| 4,751,777 A | * | 6/1988 | Savel, III |
| 4,900,639 A | * | 2/1990 | Hodes et al. |
| 5,705,126 A | * | 1/1998 | Bohsmann et al. ......... 420/561 |

FOREIGN PATENT DOCUMENTS

| | | | |
|---|---|---|---|
| DE | 246489 | | 6/1987 |
| EP | 0702095 | | 3/1996 |
| EP | 0717121 | | 6/1996 |
| GB | 2252 565 | * | 8/1992 |
| JP | 4002739 | * | 1/1992 |

* cited by examiner

Primary Examiner—Sikyin Ip
(74) Attorney, Agent, or Firm—Friedrich Kueffner

(57) ABSTRACT

A plain bearing for necks of rolls of rolling mills includes a bearing bushing of metal and a plain bearing alloy introduced into the bushing. The plain bearing alloy is based on tin with antimony and copper and contains of 6.8 to 7.2 percent by weight antimony, 6.3 to 6.7 percent by weight copper, 0.5 to 0.7 percent by weight zinc, 0.05 to 0.15 percent by weight silver, and tin as the remainder, and wherein the plain bearing alloy is applied to an inner mantle of a pre-heated bearing bushing as a rough layer thickness of 4 to 5 mm by centrifugal casting.

2 Claims, 1 Drawing Sheet

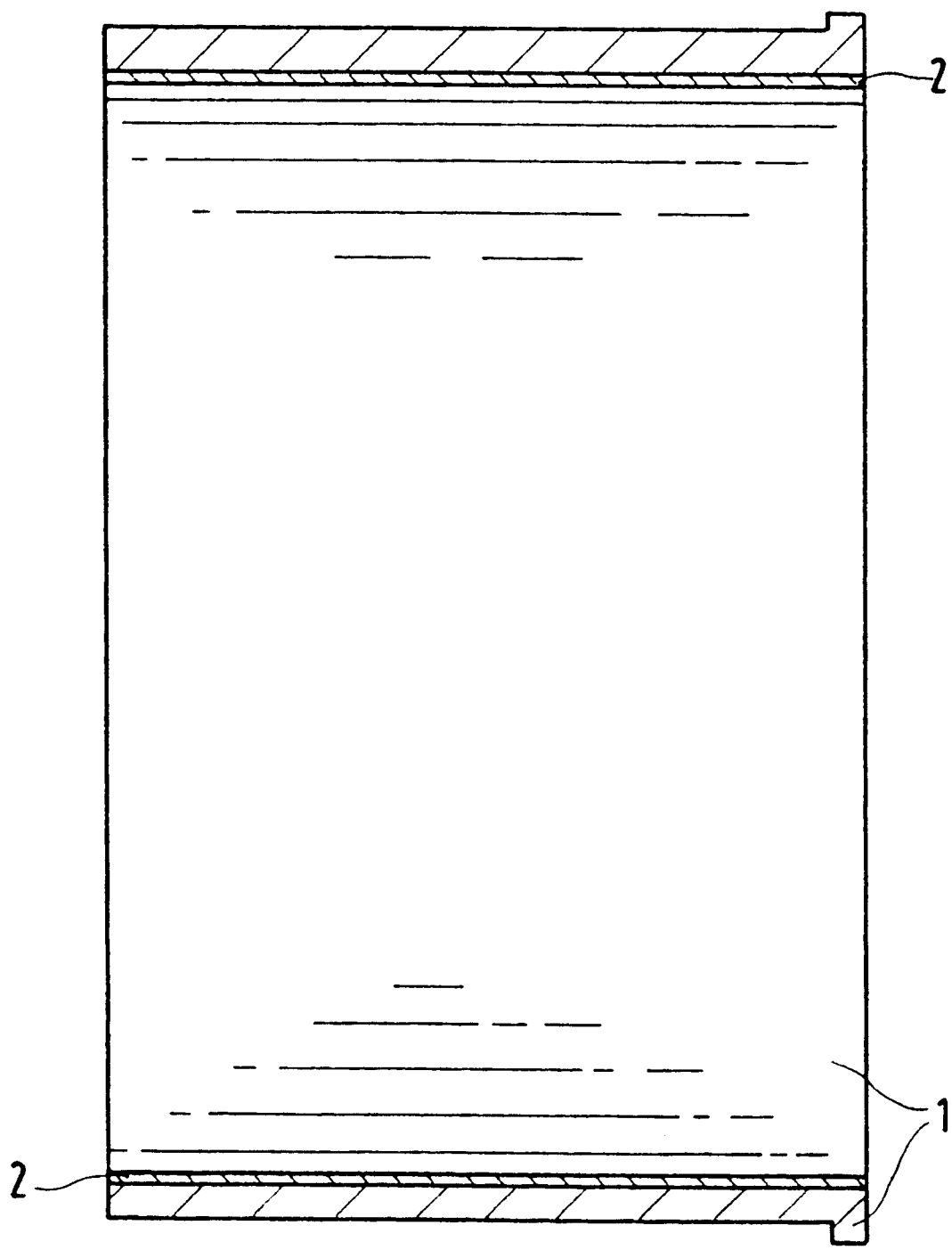

PLAIN BEARING PRODUCING METHOD

BACKGROUND OF THE INVENTION

1. Field of the Invention

The invention relates to a plain bearing for necks of the rolls of rolling mills comprising a bearing bushing of metal and a plain bearing alloy introduced into it and based on tin with antimony and copper.

2. Description of the Related Art

Such bearings have been produced for many years, for example, as oil film bearings. The employed plain bearing alloy, however, is relatively soft so that it flows easily when under load. This flowing results in a loss of shape stability and requires a relatively quick exchange of the bearings for new or reworked bearings. Moreover, the resistance to pressure of the plain bearing alloy is relatively small.

It is also known to add cadmium to the known plain bearing alloys by which measure it was possible to increase the resistance to pressure. Cadmium-containing alloys, however, are no longer used as a result of their toxicity despite their advantages with respect to the resistance to pressure. Therefore, the known plain bearing alloys have been used again.

From EP 0 717 121 B1 plain bearing alloys are known which, by addition of silver and zinc, have the advantage of a higher compression limit and an improved repeated impact flexural load. These new alloys are used primarily in turbines, compressors, pistons and expansion engines. The advantage is that no toxic components are added to the plain bearing metal. The use of these alloys for necks of rolls, however, has not been easily possible in the past because the alloy components according to this prior art fluctuated widely so that the required minimal flow properties and the great resistance to pressure could not be realized in the desired way.

SUMMARY OF THE INVENTION

It is an object of the invention to improve a known plain bearing as well as a method for producing the plain bearing such that an excellent shape stability is provided as a result of minimal flow tendency and a high resistance to pressure so that, as a result, the bearings experience a long service life.

For this purpose, the plain bearing alloy is composed of 6.8 to 7.2 percent by weight antimony, 6.3 to 6.7 percent by weight copper, 0.5 to 0.7 percent by weight zinc, 0.05 to 0.15 percent by weight silver, an tin as the remainder. It was found that the use of such a plain bearing alloy significantly increases the shape stability and the resistance to pressure.

BRIEF DESCRIPTION OF THE DRAWING

In the drawings:

The single FIGURE of the drawing is a sectional view of a bearing bushing.

DETAILED DESCRIPTION OF THE INVENTION

It is however advantageous when in the production of the plain bearings the plain bearing alloy is applied onto the inner mantle of the pre-heated bearing bushing in the form of a rough layer thickness of 4 to 7 mm by centrifugal casting. In the past, rough layer thicknesses of 8 to 12 mm have been required in order to obtain a finished layer thickness of 1.25 mm. By reducing the rough layer thickness, on the one hand, a significantly reduced amount of alloy material must be employed so that a more cost-efficient manufacture of the bearing is possible; on the other hand, a significantly reduced amount of alloy material must be cooled. Accordingly, faster cooling periods and thus optimized microstructure transformations can be achieved which have a positive effect on the shape stability and the resistance to pressure of the bearing material.

Moreover, during machining of the plain bearing by a cutting machining process less material must be removed from the rough layer thickness in order to reach the final thickness so that the working step is shortened. Fewer cuttings which must be disposed of are produced, and the machining device becomes shorter and thus less loaded.

The reduced flow tendency and the higher resistance to pressure have the effect that the bearing in operation will not wear as easily and quickly so that a longer service life can be achieved. The bearings have to be reworked less frequently, respectively, must be replaced less frequently with new bearings. Also, in the reworking process the inventive alloy can again be used so that the advantages of the reduced flow tendency and higher resistance to pressure also apply to reworked bearings.

The FIGURE shows a bearing bushing 1 which is pre-heated and into which the plain bearing alloy 2 comprised of 7 percent by weight antimony, 6.5 percent by weight copper, 0.6 percent by weight zinc, 0.1 percent by weight silver, and tin as the remainder is introduced, which is cooled at least at 0.5 C/sec, and which has been turned from the rough layer thickness of 4 to 7 mm to a finished layer thickness of 0.5 to 1.2 mm.

What is claimed is:

1. A method for producing plain bearings for necks of rolls of rolling mills with a bearing bushing of metal and a plain bearing alloy introduced into the bushing, wherein the plain bearing alloy is based on tin with antimony and copper, and wherein the plain bearing alloy is comprised of 6.8 to 7.2 percent by weight antimony, 6.3 to 6.7 percent by weight copper, 0.5 to 0.7 percent by weight zinc, 0.05 to 0.15 percent by weight silver, and tin as the remainder, the method comprising pre-heating the bearing bushing and applying the plain bearing alloy onto an inner mantle of the pre-heated bearing bushing as a rough layer thickness of 4–7 mm by centrifugal casting, comprising cooling the bearing bushing after completed centrifugal casting at least at 0.5 C./sec, and subsequently turning the plain bearing alloy to a finished layer thickness of between 0.5 and 1.2 mm.

2. The method according to claim 1, wherein the plain bearing alloy (2) is comprised of 7 percent by weight antimony, 6.5 percent by weight copper, 0.6 percent by weight zinc, 0.1 percent by weight silver, and tin as the remainder.

* * * * *